US010481692B2

(12) United States Patent
Ullrich et al.

(10) Patent No.: US 10,481,692 B2
(45) Date of Patent: *Nov. 19, 2019

(54) METHOD AND APPARATUS FOR MULTI-TOUCH TACTILE TOUCH PANEL ACTUATOR MECHANISMS

(71) Applicant: Immersion Corporation, San Jose, CA (US)

(72) Inventors: Christopher J. Ullrich, Ventura, CA (US); Ryan Steger, Sunnyvale, CA (US); Daniel H. Gomez, Newton, MA (US)

(73) Assignee: IMMERSION CORPORATION, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,086

(22) Filed: Jul. 17, 2017

(65) Prior Publication Data
US 2017/0315618 A1 Nov. 2, 2017

Related U.S. Application Data

(63) Continuation of application No. 14/986,667, filed on Jan. 2, 2016, now Pat. No. 9,715,280, which is a (Continued)

(51) Int. Cl.
*G06F 3/01* (2006.01)
*G06F 3/041* (2006.01)
*G09B 21/00* (2006.01)

(52) U.S. Cl.
CPC ............ *G06F 3/016* (2013.01); *G06F 3/0414* (2013.01); *G09B 21/004* (2013.01); *G06F 2203/04104* (2013.01)

(58) Field of Classification Search
CPC .......... G06F 2203/041; G06F 3/03547; G06F 3/041; G06F 3/0412; G06F 3/0414;
(Continued)

(56) References Cited

U.S. PATENT DOCUMENTS 4,516,112 A * 5/1985 Chen ................... G06F 3/041
310/311
5,165,897 A * 11/1992 Johnson ............... G06F 3/011
340/4.12
(Continued)

FOREIGN PATENT DOCUMENTS

WO WO 2004106099 A1 * 12/2004 ............. B60K 35/00

*Primary Examiner* — Grant Sitta
(74) *Attorney, Agent, or Firm* — Medler Ferro Woodhouse & Mills PLLC

(57) ABSTRACT

A method and apparatus of actuator mechanisms for a multi-touch tactile touch panel are disclosed. The tactile touch panel includes an electrical insulated layer and a tactile layer. The top surface of the electrical insulated layer is capable of receiving an input from a user. The tactile layer includes a grid or an array of haptic cells. The top surface of the haptic layer is situated adjacent to the bottom surface of the electrical insulated layer, while the bottom surface of the haptic layer is situated adjacent to a display. Each haptic cell further includes at least one piezoelectric material, Micro-Electro-Mechanical Systems ("MEMS") element, thermal fluid pocket, MEMS pump, resonant device, variable porosity membrane, laminar flow modulation, or the like. Each haptic cell is configured to provide a haptic effect independent of other haptic cells in the tactile layer.

17 Claims, 11 Drawing Sheets

Related U.S. Application Data continuation of application No. 11/823,192, filed on Jun. 26, 2007, now abandoned.

(58) Field of Classification Search
CPC ...... G06F 3/0416; G06F 3/0418; G06F 3/046; G06F 3/047; G06F 3/016; G06F 2203/04104; H05K 9/0073; H05K 9/0079; H05K 9/0081; H05K 9/0088; G09B 21/004
USPC ........................................................ 345/173
See application file for complete search history.

(56) References Cited

U.S. PATENT DOCUMENTS

| | | | |
|---|---|---|---|
| 5,222,895 A | 6/1993 | Fricke | |
| 5,685,721 A * | 11/1997 | Decker | G09B 21/003 434/114 |
| 5,717,423 A * | 2/1998 | Parker | G06F 3/016 345/108 |
| 5,718,588 A * | 2/1998 | Tretiakoff | G09B 21/003 340/407.1 |
| 5,973,441 A * | 10/1999 | Lo | H01L 41/098 310/330 |
| 6,303,008 B1 | 10/2001 | Pichulo | |
| 6,337,678 B1 * | 1/2002 | Fish | G06F 3/011 345/156 |
| 6,445,284 B1 * | 9/2002 | Cruz-Hernandez | G06F 3/016 340/4.12 |
| 6,535,201 B1 * | 3/2003 | Cooper | G06F 3/016 340/407.1 |
| 6,693,516 B1 | 2/2004 | Hayward | |
| 6,819,312 B2 | 11/2004 | Fish | |
| 6,940,485 B2 | 9/2005 | Noolandi | |
| 7,113,177 B2 | 9/2006 | Franzen | |
| 7,138,985 B2 | 11/2006 | Nakajima | |
| 7,245,292 B1 * | 7/2007 | Custy | G06F 3/011 178/18.01 |
| 7,352,356 B2 | 4/2008 | Roberts | |
| 7,382,357 B2 * | 6/2008 | Panotopoulos | G06F 3/0202 345/168 |
| 8,576,174 B2 | 11/2013 | Cruz-Hernandez | |
| 9,715,280 B2 * | 7/2017 | Ullrich | G06F 3/016 |
| 2002/0054060 A1 | 5/2002 | Schena | |
| 2002/0149561 A1 * | 10/2002 | Fukumoto | G01C 21/3664 345/156 |
| 2003/0122779 A1 * | 7/2003 | Martin et al. | G06F 1/1662 345/156 |
| 2003/0151597 A1 * | 8/2003 | Roberts | G09B 21/004 345/173 |
| 2005/0007342 A1 * | 1/2005 | Cruz-Hernandez | B06B 1/0603 345/161 |
| 2005/0030292 A1 * | 2/2005 | Diederiks | G09B 21/003 345/173 |
| 2005/0040962 A1 | 2/2005 | Funkhouser et al. | |
| 2005/0047621 A1 | 3/2005 | Cranfill | |
| 2005/0057528 A1 * | 3/2005 | Kleen | G06F 3/016 345/173 |
| 2005/0130360 A1 * | 6/2005 | Zhan | B81B 3/0021 438/197 |
| 2005/0285846 A1 | 12/2005 | Funaki | |
| 2006/0071911 A1 * | 4/2006 | Sullivan | G06F 3/043 345/173 |
| 2006/0071917 A1 * | 4/2006 | Gomez | G06F 3/016 345/184 |
| 2006/0115348 A1 | 6/2006 | Kramer | |
| 2006/0197750 A1 | 9/2006 | Kerr | |
| 2006/0238510 A1 * | 10/2006 | Panotopoulos | G06F 3/0202 345/168 |
| 2006/0256075 A1 * | 11/2006 | Anastas | G06F 3/016 345/156 |
| 2007/0182718 A1 * | 8/2007 | Schoener | B60K 35/00 345/173 |
| 2007/0229233 A1 | 10/2007 | Dort | |
| 2007/0236450 A1 | 10/2007 | Colgate | |
| 2007/0236478 A1 | 10/2007 | Geaghan et al. | |
| 2008/0297475 A1 | 12/2008 | Woolf et al. | |
| 2009/0160763 A1 | 6/2009 | Cauwels | |
| 2009/0284485 A1 | 11/2009 | Colgate | |

* cited by examiner

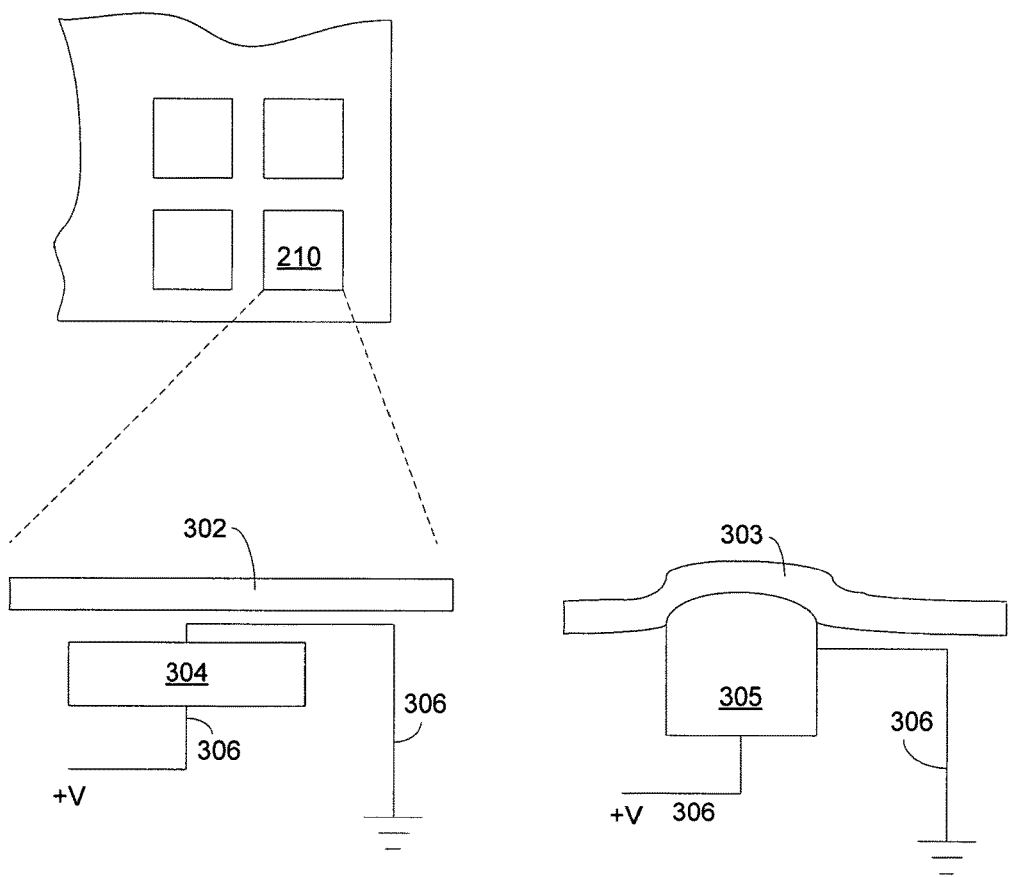
FIG 3(a)  FIG 3(b)

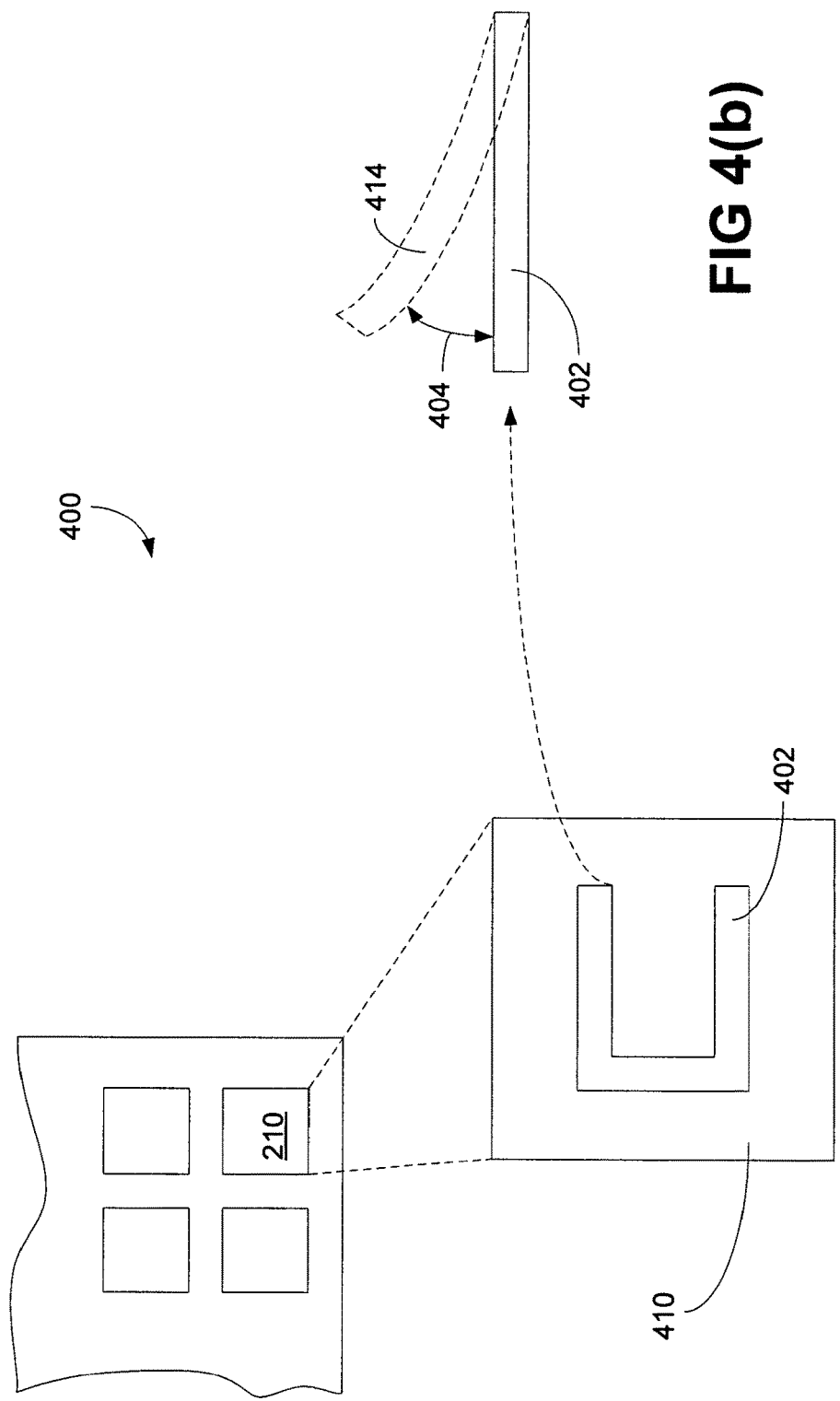

METHOD AND APPARATUS FOR MULTI-TOUCH TACTILE TOUCH PANEL ACTUATOR MECHANISMS

CROSS REFERENCE TO RELATED APPLICATIONS

This application is a continuation of prior U.S. application Ser. No. 14/986,667, filed Jan. 2, 2016, now U.S. Pat. No. 9,715,280, which is a continuation of prior U.S. application Ser. No. 11/823,192, filed Jun. 26, 2007, abandoned, the contents of which are hereby incorporated by reference in their entirety.

FIELD OF THE INVENTION

The present invention relates to the field of electronic interface devices. More specifically, the present invention relates to a user interface device having haptic actuators.

BACKGROUND OF THE INVENTION

As computer-based systems, appliances, automated teller machines (ATM), point of sale terminals and the like have become more prevalent in recent years, the ease of use of the human-machine interface is becoming more and more important. Such interfaces should operate intuitively and require little or no training so that they may be used by virtually anyone. Many conventional user interface devices are available on the market, such as the key board, the mouse, the joystick, and the touch screen. One of the most intuitive and interactive interface devices known is the touch panel, which can be a touch screen or a touch pad. A touch screen includes a touch sensitive input panel and a display device, usually in a sandwich structure and provides a user with a machine interface through touching a panel sensitive to the user's touch and displaying content that the user "touches." A conventional touch pad is a small planar rectangular pad, which can be installed near a display, on a computer, an automobile, ATM machines, and the like.

A conventional touch-sensitive component of a touch panel employs various types of touch sensing technology such as capacitive sensors, pressure sensors and the like as known in the art to detect locations being pressed on the panel. For example, a user contacts a region of a touch screen commonly with a fingertip to emulate a button press and/or moves his or her finger on the panel according to the graphics displayed behind the panel on the display device.

A problem associated with the conventional approach for generating a haptic feedback is relying on global motion of a mechanical carrier attached to the touch screen to produce haptic or tactile feedback. Using the global motion approach typically limits to one haptic feedback to one input at a given time.

Accordingly, there is a need for a touch panel or surface, which is capable of providing multiple tactile or haptic feedbacks in response to multiple touches simultaneously at a given time.

SUMMARY OF THE INVENTION

A method and apparatus of actuator mechanisms for a multi-touch tactile touch panel are disclosed. The tactile touch panel includes an electrical insulated layer and a tactile layer, wherein the electrical insulated layer includes a top surface and a bottom surface. The top surface of the electrical insulated layer is capable of receiving an input from a user. The tactile layer, which is also known as a haptic layer, a feedback layer, or the like, includes a grid or an array of haptic cells. The top surface of the haptic layer is situated adjacent to the bottom surface of the electrical insulated layer, while the bottom surface of the haptic layer is situated adjacent to a display. Each haptic cell further includes at least one piezoelectric material, Micro-Electro-Mechanical Systems ("MEMS") element, thermal fluid pocket, MEMS pump, resonant device, variable porosity membrane, laminar flow modulation, or the like. Each haptic cell is configured to provide a haptic effect independent of other haptic cells in the tactile layer.

Additional features and benefits of the present invention will become apparent from the detailed description, figures and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 3(a-b) illustrates a haptic cell using piezoelectric materials to generate haptic effects in accordance with one embodiment of the present invention;

FIG. 4(a-b) is a diagram illustrating another embodiment of a haptic cell using Micro-Electro-Mechanical Systems ("MEMS") device to generate haptic effects in accordance with one embodiment of the present invention;

DETAILED DESCRIPTION

Figure 1:
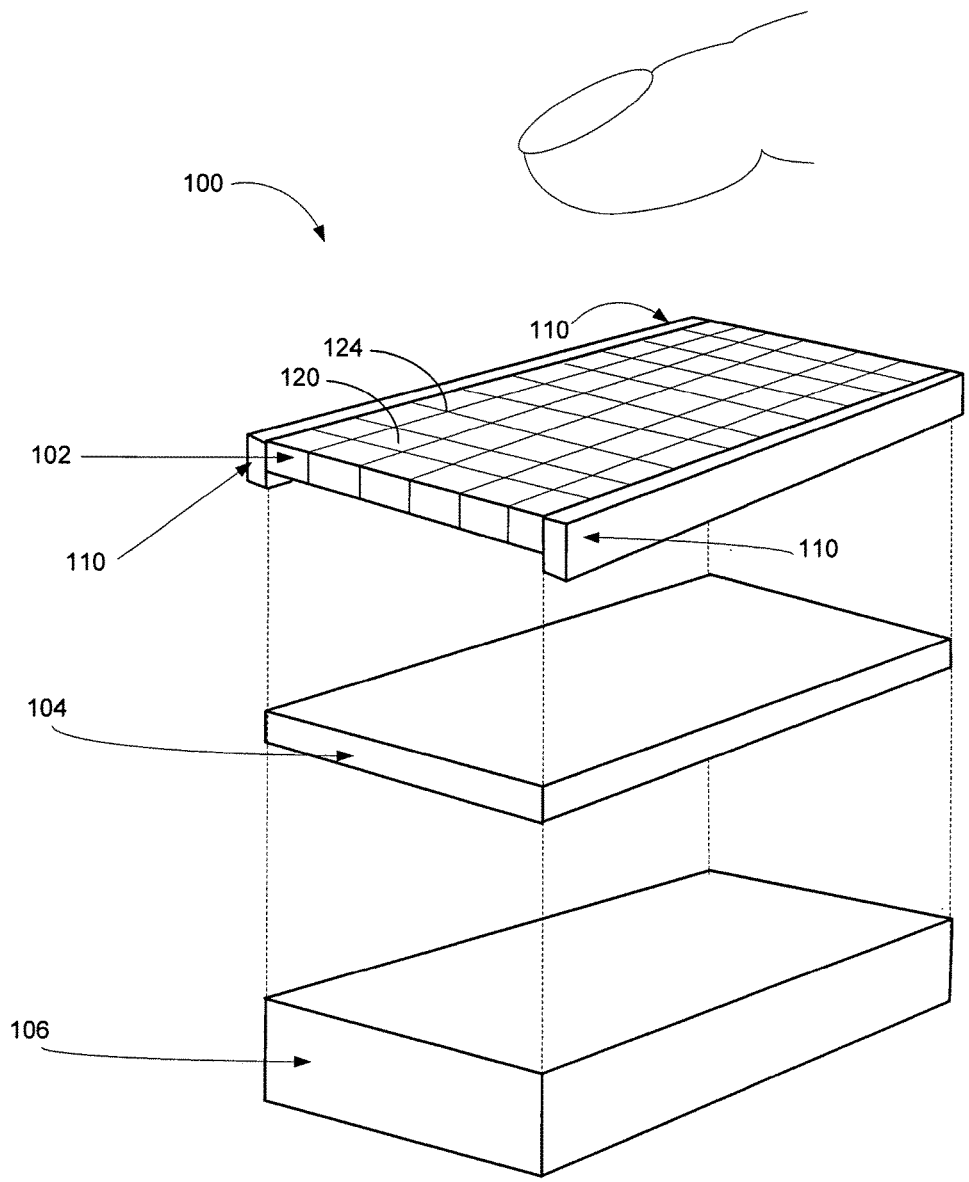
FIG. 1 illustrates an electronic interface device or system capable of providing multiple tactile feedbacks in response to multiple touches in accordance with one embodiment of the present invention.

Embodiments of the present invention are described herein in the context of a method, system and apparatus of actuator mechanisms for a multi-touch tactile touch panel. Those of ordinary skilled in the art will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts.

In the interest of clarity, not all of the standard hardware and routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skilled in the art having the benefit of this disclosure.

The present invention discloses an electronic interface device using multi-touch actuator mechanisms for a touch panel. In one embodiment, the interface device having a tactile touch panel is capable of providing multiple haptic feedbacks in response to multiple contacts simultaneously. The haptic feedback may also be referred to as tactile effect, tactile feedback, haptic effect, force feedback, or vibrotactile feedback. The tactile touch panel can also be referred to as a haptic touch pad, vibrotactile touch panel, force feedback touch panel, haptic touch panel, or the like.

The tactile touch panel, in one embodiment, includes an electrical insulated layer and a tactile layer, wherein the electrical insulated layer includes a top surface and a bottom surface. The top surface of the electrical insulated layer is capable of receiving an input from a user. The tactile layer, which is also known as a haptic layer, a feedback layer, or the like, includes a grid or an array of haptic cells. The top surface of the haptic layer is situated adjacent to the bottom surface of the electrical insulated layer, while the bottom surface of the haptic layer is situated adjacent to a display. Each haptic cell further includes at least one piezoelectric material, Micro-Electro-Mechanical Systems ("MEMS") element, thermal fluid pocket, MEMS pump, resonant device, variable porosity membrane, laminar flow modulation, or the like. Each haptic cell is configured to provide a haptic effect independent of other haptic cells in the tactile layer.

FIG. 1 illustrates an electronic interface device or system 100 capable of providing multiple tactile feedbacks in response to multiple touches substantially simultaneous in accordance with one embodiment of the present invention. System 100 includes a touch-sensitive panel or touch panel 102, a display panel 104, and a case 106. Touch-sensitive panel 102, in one embodiment, is made of substantially transparent materials, and is capable of transmitting light so that objects or images displayed in display 104 can be seen through the touch-sensitive panel 102. Display 104 can be any type of display such as a cathode ray tube ("CRT"), liquid crystal display ("LCD"), plasma display, flat panel display, flexible display or the like. Both touch-sensitive panel 102 and display 104 may be installed together with case 106. It should be noted that touch-sensitive panel 102 and display 104 can be integrated into the same unit or device. In an alternative embodiment, display 102 may be removed from system 100 when displaying images are not necessary. For example, a touch pad used on a laptop or on a vehicle dashboard, which does not require displaying images, can be opaque.

Touch panel 102, in one embodiment, includes an insulated layer and an array or a grid of haptic cells 120, wherein haptic cells 120 are separated by borders 124. Each of haptic cells 120 is capable of providing a haptic effect in response to an input independent of other haptic cells 120 in touch panel 102. For example, when multiple contacts are depressed on touch panel 102 substantially simultaneously, touch-sensitive panel or touch panel 102 activates haptic cells 120 to generate multiple haptic effects in response to the multiple contacts. It should be noted that the multiple contacts may be made by one finger or multiple fingers. The dimension or size of each of the haptic cells 120 is configured to be less than 5 millimeters×5 millimeters, although other sizes may be used as appropriate. Touch panel 102 accepts a user's selection(s) when one or more cells 120 are contacted, touched or depressed by the user's finger(s). In one embodiment, touch panel 102 rejects a user's selection when a border 124 is touched.

Touch panel 102 further includes circuits 110 mounted at the edge or otherwise attached to the panel via a cable or flexible circuit. Circuits 110 are used to provide digital control signals and/or a power source to haptic cells 120. In one embodiment, case 106 further includes a digital processing unit for data processing. In another embodiment, touch panel 102 is capable of providing a tactile overlay that includes a grid of haptic cells 120 wherein each of the haptic cells 120 is approximately the size of half (½) a fingertip. Each haptic cell 120 is capable of providing vibrotactile or kinesthetic feedback through a localized strain. In one embodiment, the grid cells can be hexagonal or any other type of two-dimensional (2-D) configurations. Alternatively, it should be noted that the grid of haptic cells 120 does not necessarily cover the entire touch panel surface. The layout of haptic cells 120 can be selectively configured to meet the application's requirements.

Figure 2:
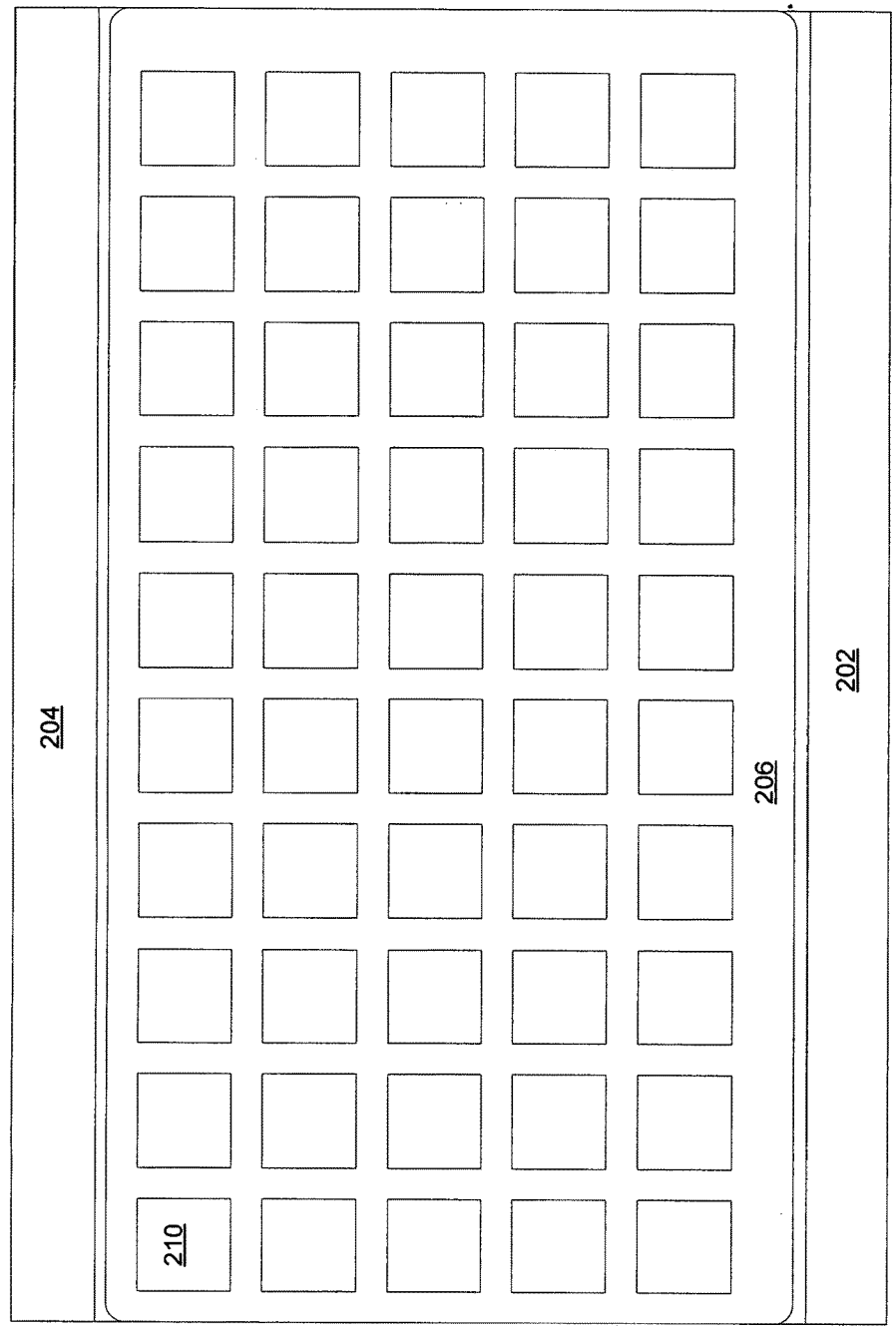
FIG. 2 is a top view of an interface device illustrating a haptic touch panel having an array or a grid of haptic cells in accordance with one embodiment of the present invention.

FIG. 2 illustrates a top view of an interface device 200 illustrating a haptic touch panel 206 having an array or a grid of haptic cells 210 in accordance with one embodiment of the present invention. Referring back to FIG. 2, device 200 further includes circuit blocks 202-204, which are configured to perform various functions such as maintaining power supplies, transmitting control signals, and/or controlling fluid flow. In one embodiment, device 200 also includes a display, which is placed behind touch panel 206. In one embodiment, touch panel 206 is substantially transparent thereby the images displayed by the display can be viewed through touch panel 206. When the application does not require displaying images, the surface of touch panel 206 is opaque and blocks most of the light from passing through touch panel 206.

An array of haptic cells 210 of touch panel 206 is capable of generating haptic effects in response to their control signals. Control signals, in one aspect, are generated in accordance with the inputs received. To provide multiple haptic effects in response to multiple touches, each haptic cell 210 is capable of initiating a haptic effect independent of other haptic cells 210 in touch panel 206. In another embodiment, each of haptic cells 210 of touch panel 206 is capable of generating a unique haptic effect in response to a specific input. A unique haptic effect initiates a specific haptic sensation to a user's input. It should be noted that each cell 210 can be further divided into multiple sub cells wherein each sub cell can generate its own haptic effect.

FIG. 3(a) illustrates a haptic cell 210 using piezoelectric materials to generate haptic effects in accordance with one embodiment of the present invention. Cell 210 includes an electrical insulated layer 302, a piezoelectric material 304, and wires 306. Electrical insulated layer 302 has a top surface and a bottom surface, wherein the top surface is configured to receive inputs. A grid or an array of piezoelectric materials 304, in one embodiment, is constructed to form a piezoelectric or haptic layer, which also has a top and a bottom surface. The top surface of the piezoelectric layer is situated adjacent to the bottom surface of electrical insulated layer 302. Each cell 210 includes at least one piezoelectric material 304 wherein piezoelectric material 304 is used to generate haptic effects independent of other piezoelectric cells 210 in piezoelectric layer. In one embodiment, multiple adjacent or neighboring cells 210 are capable of generating multiple haptic effects in response to multiple substantially simultaneous touches. In another embodiment, each of cells 210 has a unique piezoelectric material thereby it is capable of initiating a unique haptic sensation.

It should be noted that a tactile touch panel, which includes an electrical insulated layer 302 and a piezoelectric layer, in some embodiments further includes a display. This display may be coupled to the bottom surface of the piezoelectric layer and is capable of projecting images that are viewable from the top surface of electrical insulated layer 302. It should be noted that the display can be a flat panel display or a flexible display. Piezoelectric materials 304, in one embodiment, are substantially transparent and small. The dimension of a cell 210 having piezoelectric material can be configured to be less than 5 millimeters by 5 millimeters. The shape of piezoelectric material 304, for example, deforms in response to electrical potentials applied via electrical wires 306.

During a manufacturing process, a piezoelectric film is printed to include an array or a grid of piezoelectric cells 210. In one embodiment, a film of cells 210 containing piezoelectric materials is printed on a sheet in a cell grid arrangement. The film further includes wirings for directly addressing every cell 210 in the device using electrical control signals. Cells 210, for example, can be stimulated using edge or back mounted electronics. Piezoelectric materials may include crystals and/or ceramics such as quartz ($SiO_2$)

FIG. 3(b) illustrates a haptic cell 210 generating haptic effects in accordance with an embodiment of the present invention. During operation, when a voltage potential applies to piezoelectric material 305 via wires 306, piezoelectric material 305 deforms from its original shape of piezoelectric material 304, as shown in FIG. 3(a), to expanded shape of piezoelectric material 305. Deformation of piezoelectric material 305 causes electrical insulated layer 303 to deform or strain from its original state of layer 302, as shown in FIG. 3(a). In an alternative embodiment, piezoelectric materials 305 return to its original state as soon as the voltage potential is removed. It should be noted that the underlying concept of the present invention does not change if additional blocks (circuits or mechanical devices) are added to the device illustrated in FIG. 3(a-b). If the piezoelectric material is replaced with other materials such as shape memory alloys ("SMAs"), such material may be capable of maintaining its deformed shape for a period of time after the voltage potential is removed. It should be noted that the underlying concept of the embodiments of the present invention does not change if different materials other than piezoelectric actuators are employed.

FIG. 4(a) is a diagram 400 illustrating another embodiment of a haptic cell 210 using Micro-Electro-Mechanical Systems ("MEMS") device 402 to generate haptic effects in accordance with one embodiment of the present invention. Diagram 400 depicts a block 410, which shows a top view of cell 210. Cell 210 includes a MEMS device 402. In one embodiment, MEMS device 402 is substantially transparent thereby the image projection from a display, not shown in FIG. 4(a), can be viewed through block 410. It should be noted that each of haptic cells 210 is coupled to at least one wire to facilitate and generate haptic effects.

MEMS can be considered as an integration of mechanical devices, sensors, and electronics on a silicon or organic semiconductor substrate, which can be manufactured through conventional microfabrication process. For example, the electronic devices may be manufactured using semiconductor fabrication process and micromechanical devices may be fabricated using compatible microfabrication process. In one embodiment, a grid or an array of MEMS devices 402 are made of multiple cantilever-springs. A grid of cantilever-springs can be etched using MEMS manufacturing techniques. Also, electrical wirings for stimulating or driving cantilever-springs can also be directly etched onto the surface of the MEMS device 402 thereby every single MEMS device can be correctly addressed. MEMS cantilevers can be stimulated using a resonant drive (for vibrotactile) or direct actuation (kinesthetic). In another embodiment, the MEMS are stimulated in response to the energy generated by the display. For example, radio frequency energy, light, or heat generated by the pixels of a plasma display could provide an excitation source or activation signal for a MEMS haptic cell.

FIG. 4(b) illustrates a side view of MEMS device 402, wherein MEMS device 412 can be stimulated or deformed from its original state of MEMS device 402 to deformed state of MEMS device 414 when a voltage potential across MEMS device is applied. Displacement 404 between the original state and the deformed state depends on the composition of materials used and the size of MEMS device 402. Although smaller MEMS devices 402 are easier to fabricate, they offer smaller displacement 404. In one embodiment, cantilever-springs can be made of piezo materials. It should be noted that the actuation of piezo material is generally vibrotactile sensation. It should be further noted that piezo material can be used as a sensor for sensing fingertip positions and depressions.

MEMS device 402, in another embodiment, uses shape memory alloy ("SMA") in place of cantilever-spring as mentioned above. The actuation generated by MEMS device 402 using SMA provides kinesthetic actuation. SMA, also known as memory metal, could be made of copper-zinc-aluminum, copper-aluminum-nickel, nickel-titanium alloys, or a combination of copper-zinc-aluminum, copper-aluminum-nickel, and/or nickel-titanium alloys. Upon deforming from SMA's original shape, SMA regains its original shape in accordance with an ambient temperature and/or surrounding environment. It should be noted that the present invention may combine piezoelectric elements, cantilever-spring, and/or SMA to achieve a specific haptic sensation.

Figure 5A:
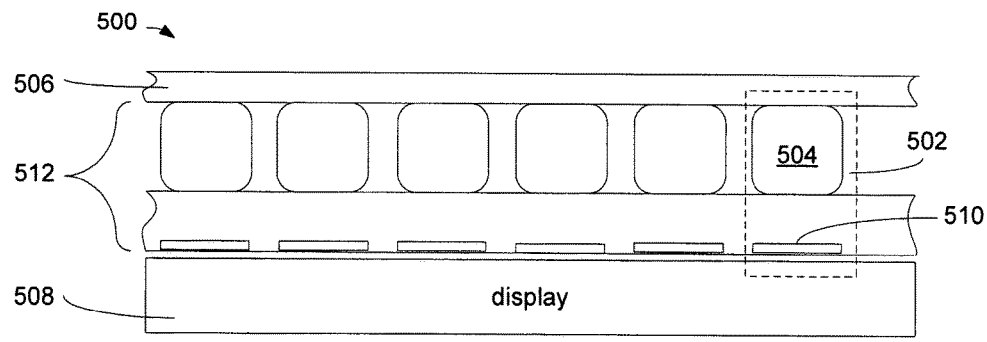
FIG. 5(a-b) illustrates a side view of an interface device having an array of haptic cells with thermal fluid pockets in accordance with one embodiment of the present invention.

FIG. 5(a) is a side view diagram of an interface device 500 illustrating an array of haptic cells 502 with thermal fluid pockets 504 in accordance with one embodiment of the present invention. Device 500 includes an insulated layer 506, a haptic layer 512, and a display 508. While the top surface of insulated layer 506 is capable of receiving inputs from a user, the bottom surface of insulated layer 506 is placed adjacent to the top surface of haptic layer 512. The bottom surface of haptic layer 512 is placed adjacent to display 508, wherein haptic layer 512 and insulated layer 506 may be substantially transparent thereby objects or images displayed in display 508 can be seen through haptic layer 512 and insulated layer 506. It should be noted that display 508 is not a necessary component in order for the interface device to function.

Haptic layer 512, in one embodiment, includes a grid of fluid filled cells 502, which further includes at least one thermal fluid pocket 504 and an associated activating cell 510. It should be noted that each of fluid filled cells 502 can include multiple thermal fluid pockets 504 and associated activating cells 510. In another embodiment, a fluid filled cell 502 includes multiple associated or shared activating cells 510 thereby initiating a different activating cell generates a different haptic sensation(s).

Activating cell 510, in one embodiment, is a heater, which is capable of heating an associated thermal fluid pocket 504. Various electrical, optical, and mechanical techniques relating to heating technology can be used to fabricate activating cells 510. For example, various electrically controlled resistors can be used for activating cells 510, wherein resistors can be implanted in haptic layer 512 during the fabrication. Alternatively, optical stimulators such as infrared lasers can be used as activating cells 510 to heat up thermal fluid pockets 504. Optical stimulator, for example, can be mounted at the edge of the interface device. It should be noted that activating cells 510 can be any types of optical or radioactive stimulator as long as it can perform the function of a heating device. Activating cells 510 may also use rear mounted thermal stimulators, which are similar technologies like hot plasma displays such as are commonly found in flat panel plasma televisions.

Device 500 further includes a set of control wires, not shown in FIG. 5(a), wherein each of activating cells 510 is coupled to at least one pair of wires. The wires are configured to transmit activating/deactivating control signals, which are used to drive activating cells 510. It should be noted that each of fluid filled cells 502 is addressable using signals from wires or wireless networks. Display 508, in one aspect, can be a flat panel display or a flexible display. In an alternative embodiment, the physical location of display 508 is exchangeable with haptic layer 512. Also, thermal fluid pockets 504, in one embodiment, can be activated by a piezoelectric grid.

Thermal fluid pockets 504, in one embodiment, include fluid with physical properties of low specific heat and high thermal expansion. Examples of this fluid include glycerin, ethyl alcohol, or the like. Thermal fluid pockets 504 are capable of producing multiple localized strains in response to multiple touches received by insulated layer 506. Each localized strain is created by a heated thermal fluid pocket 504 wherein the heat is generated by an associated activating cell 510. In one embodiment, a thermal fluid pocket 504 changes its physical shape in accordance with the temperature of the fluid in the pocket. In another embodiment, fluid filled cell 502 has an active cooling system, which is used to restore the expanded shape of thermal fluid pocket 504 to its original shape after it is deactivated. The control of fluid temperature affects haptic bandwidth. Rapid rising of fluid temperature and fast heat dissipation of fluid enhance haptic bandwidth of thermal fluid packets.

The physical size of each fluid cell 502 can also affect the performance of the cell for generating haptic sensation(s). For example, if the size of fluid cell 504 is smaller than ½ fingertip, the performance of cell 504 enhances because smaller cell permits rapid heat dissipation as well as quick temperature rising of fluid in the cell. In another embodiment, thermal plastic pockets filled with plastic fluid are used in place of thermal fluid pockets 504 filled with thermally sensitive fluid to enhance the haptic effects. Using thermal plastic pockets filled with plastic-like fluid can produce high thermal plastic strain. For example, a type of plastic fluid is polyethylene. Thermal plastic pockets can also provide different and unique haptic sensations to the user. In another embodiment, some exotic fluids such as electrorheological and/or magnetorheological fluid can be used in place of thermal fluid in thermal fluid pockets 504. Thermal fluid pockets 504 filled with electrorheological fluid can be stimulated by a local or remote electrical field, while thermal fluid pockets 504 filled with magnetorheological fluid can be stimulated by a local or remote magnetic field.

Figure 5B:
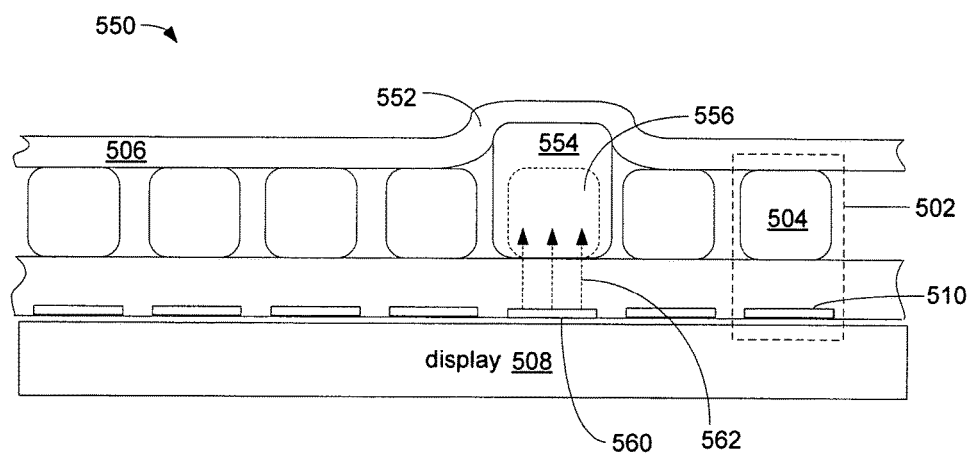

FIG. 5(b) is a side view diagram for an interface device 550 illustrating an array of haptic cells 502 using thermal fluid pockets 554 in accordance with one embodiment of the present invention. Device 550 also shows an activated thermal fluid pocket 554 and an activated activating cell 560. During the operation, thermal fluid pocket 554 increases its physical volume (or size) from its original state 556 to expanded thermal fluid pocket 554 when activating cell 560 is activated. When activating cell 560 is activated, it provides heat 562 to thermal fluid pocket 554 or 556 to expand the size of thermal fluid pocket 554 or 556. Due to the expansion of thermal fluid pocket 554, a localized portion 552 of insulated layer 506 is created. As soon as the temperature of the fluid in the thermal fluid pocket 554 cools down, the size of thermal fluid pocket 554 returns to its original state 556. The change of size between original size of a thermal fluid pocket 556 and expanded size of thermal fluid pocket 554 generates a haptic effect. It should be noted that activating cell 560 could be an electric heater or an optical heater such as an infrared simulator.

Figure 6:
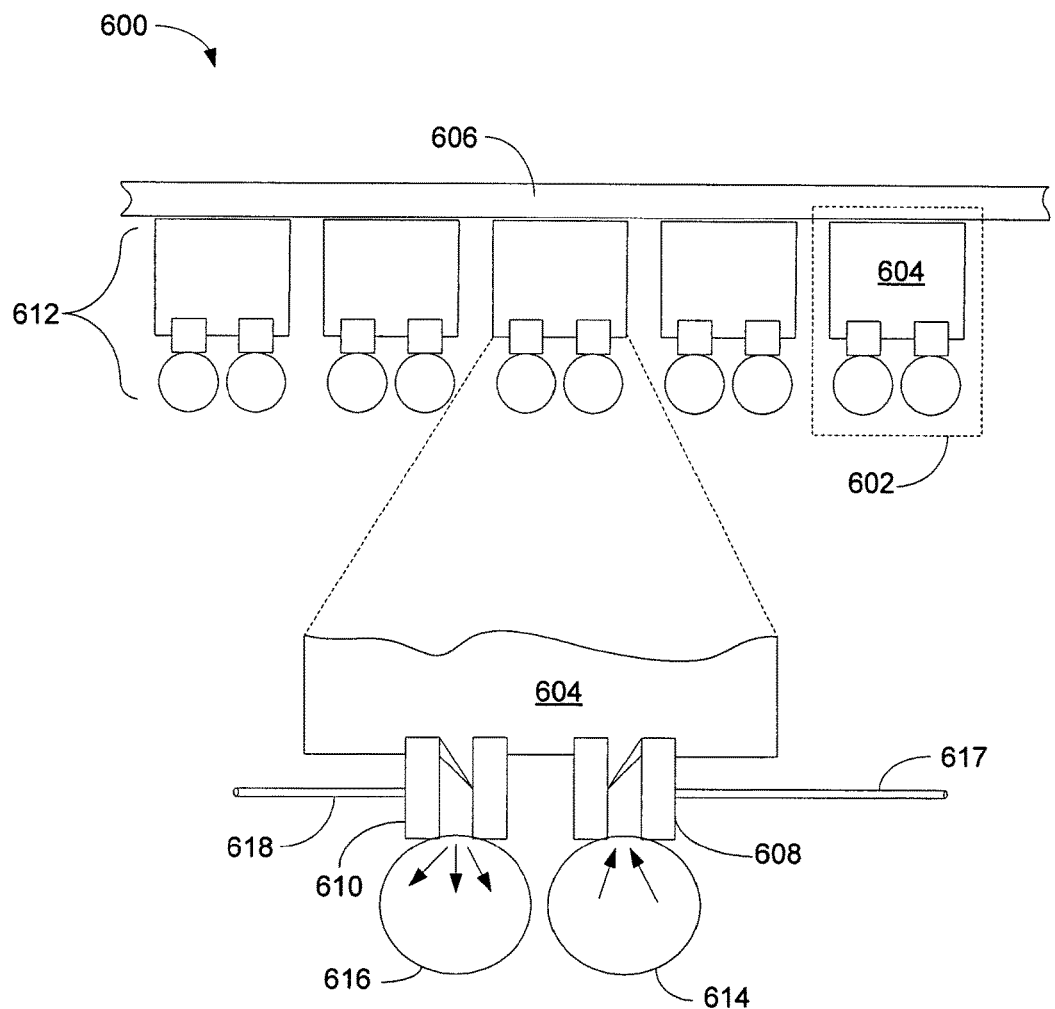
FIG. 6(a-b) illustrates a haptic cell employing Micro-Electro-Mechanical Systems pumps to generate haptic effects in accordance with one embodiment of the present invention.

FIG. 6(a) is a side view diagram of an interface device 600 illustrating an array of MEMS pumps 602 in accordance with one embodiment of the present invention. Diagram 600 includes an insulated layer 606 and a haptic layer 612. While the top surface of insulated layer 606 is configured to receive a touch or touches from a user, the bottom surface of insulated layer 606 is placed adjacent to the top surface of haptic layer 612. The bottom surface of haptic layer 612 is, in one embodiment, placed adjacent to a display (not shown in FIG. 6(a)), wherein haptic layer 612 and insulated layer 606 may be substantially transparent thereby objects or images displayed in the display can be seen through haptic layer 612 and insulated layer 606. It should be noted that display is not a necessary component in order for the interface device to function.

Haptic layer 612, in one embodiment, includes a grid of MEMS pumps 602, which further includes at least one pocket 604. Each MEMS pump 602 includes a pressurized valve 608 and a depressurized valve 610. Pressurized valve 608 is coupled to an inlet tube 614 while depressurized valve 610 is coupled to an outlet tube 616. In one embodiment, inlet tube 614, which is under high liquid pressure, is used to pump liquid through pressurized valve 608 to expand pocket 604. Similarly, outlet tube 616, which is under low pressure, is used to release the liquid through depressurized valve 610 to release the pressure from pocket 604. It should be noted that MEMS pumps 602 can be coupled to the same pressurized liquid reservoir. It should be further noted that pressurized valve 608 and depressurized valve 610 can be combined into one single valve for both inlet tube 614 and outlet tube 616. It should be further noted that inlet tube 614 and outlet tube 616 can also be combined into one tube.

A grid of MEMS pumps 602 includes an array of pressurized valves 608 and depressurized valves 610, wherein pressurized valves 608 are coupled with a rear or a side mounted liquid reservoir under pressure while depressurized vales 610 are coupled to a rear or a side mounted depressurized liquid reservoir with low pressure. Valves 608-610 control the filling and emptying the liquid pockets 604 in MEMS pumps 602 to produce localized strain. An advantage of using pressurized liquid reservoir is to quickly deform the surface of insulated layer 606 and to maintain the deformation with minimal or no energy consumption (or expenditure). It should be noted that MEMS pump 602 can also use pressurized air or other gases to achieve similar results as liquid.

Device 600 further includes a set of control wires 617-618, which can be used to control pressurized valve 608 and depressurized valve 610, respectively. It should be noted that each valve in haptic layer 612 is addressable using electrical signals transmitted from wires or wireless network.

Figure 6B:
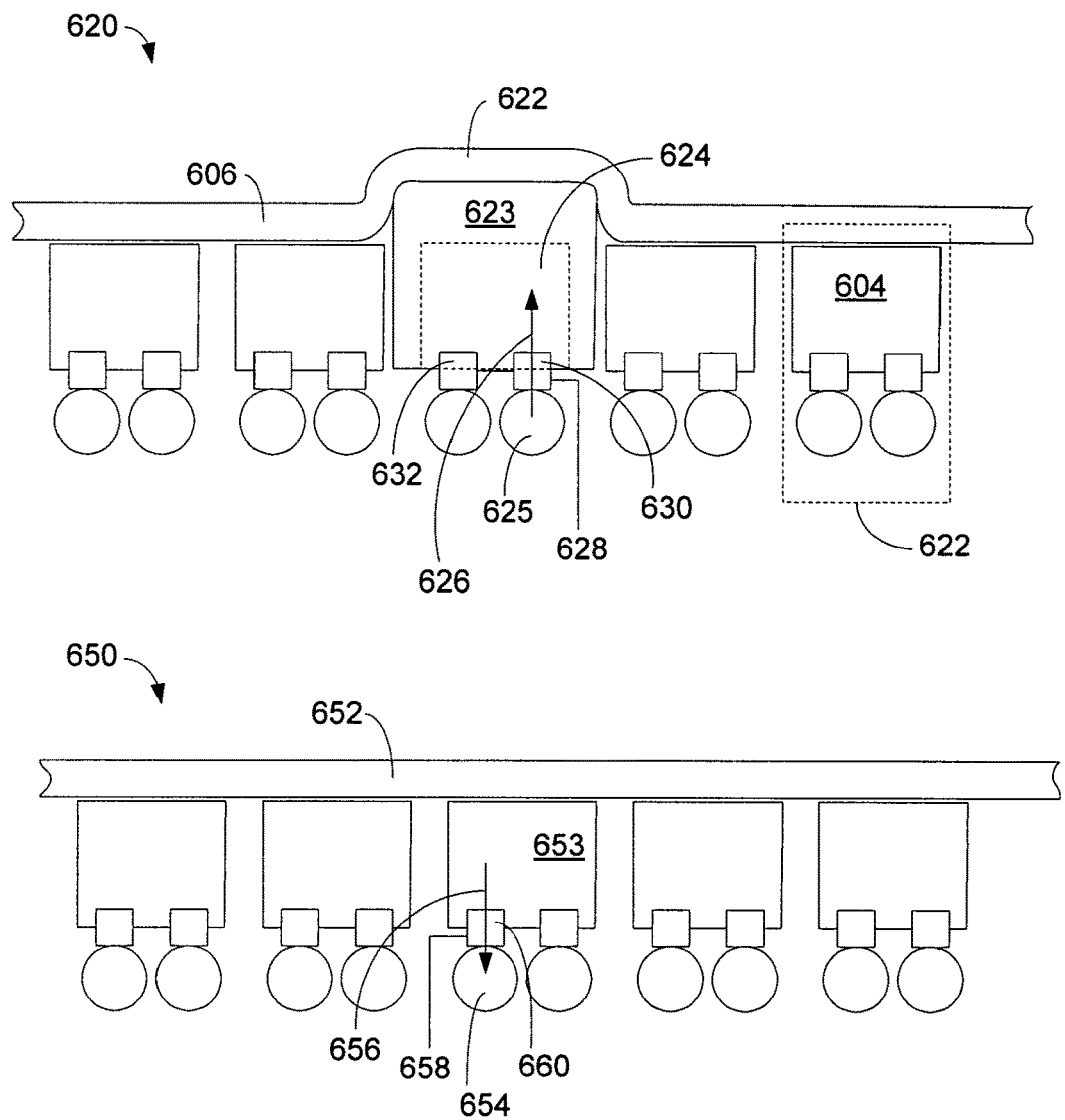

FIG. 6(b) illustrates two diagrams of an interface device 620 and 650 having an array of MEMS pumps 604 in accordance with one embodiment of the present invention. Device 620 illustrates an activated pocket 623, which includes an activated inlet valve 630 and a deactivated outlet valve 632. During an operation, pocket 623 increases its physical volume (or size) from its original state 624 to its expanded pocket 623 when inlet valve 630 is activated. When inlet valve 630 is activated (or open) in response to electrical signal from wire 628, inlet tube 625 pumps liquid 626 from pressurized reservoir to pocket 623. Due to the expansion of pocket 623, a localized strain 622 of insulated layer 606 is created.

Device 650 illustrates an activated MEMS pump returns from its expanded state of pocket 623 to the original state of pocket 653. When depressurized valve 660 is activated, depressurized valve 660 releases liquid 656 from pocket 653 to low pressurized outlet 654. It should be noted that depressurized valve 660 is controlled by at least one control signal via wire 658. The changing in volume between original size of pocket 604 and expanded size of pocket 623 generates haptic effects.

Figure 7:
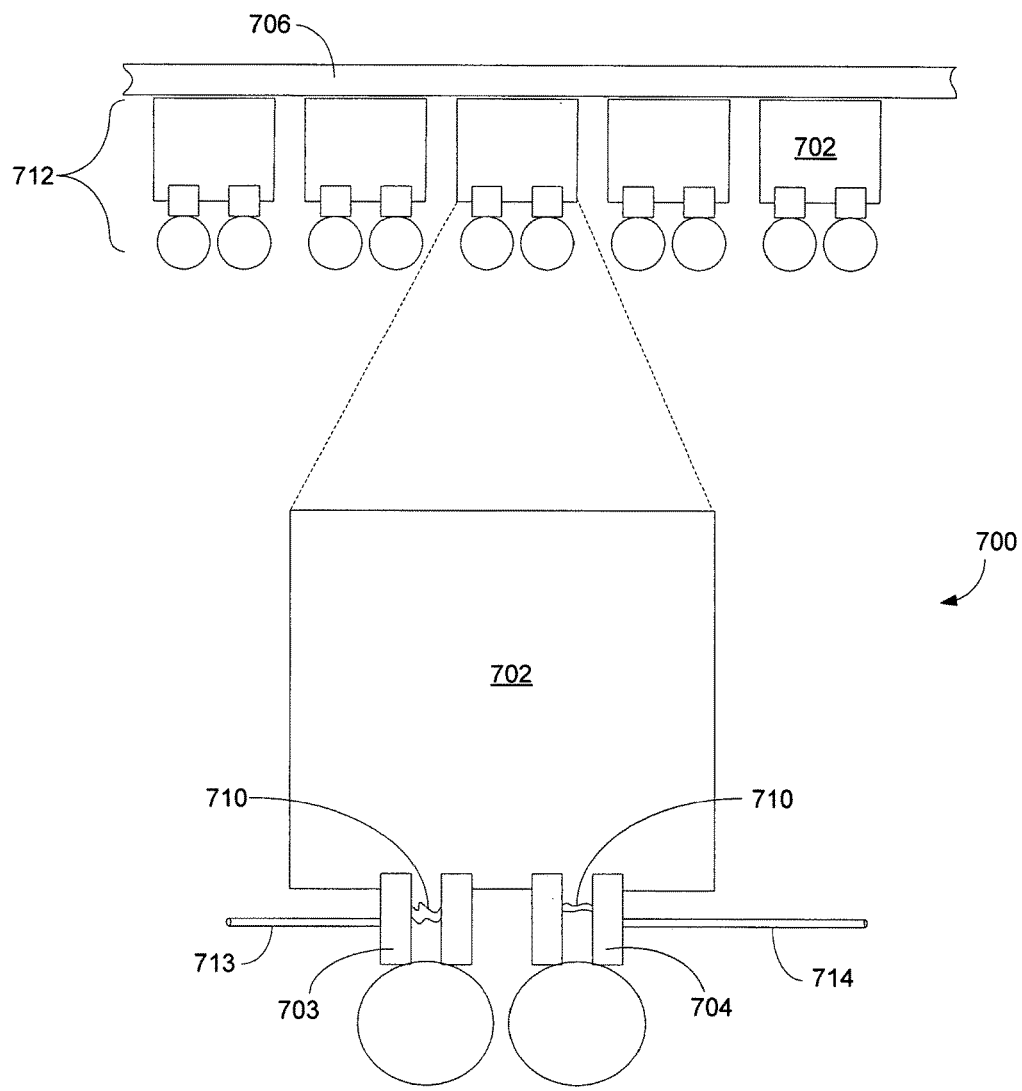
FIG. 7 illustrates a side view diagram for an interface device having an array of haptic cells using variable porosity membrane in accordance with one embodiment of the present invention.

FIG. 7 illustrates a side view diagram for an interface device 700 having an array of haptic cells 702 using variable porosity membrane 710 in accordance with one embodiment of the present invention. Device 700 includes an insulated layer 706 and a haptic layer 712. While the top surface of insulated layer 706 is configured to receive inputs from a user, the bottom surface of insulated layer 706 is placed adjacent to the top surface of haptic layer 712. The bottom surface of haptic layer 712 is, in one embodiment, placed adjacent to a display (not shown in FIG. 7), wherein haptic layer 712 and insulated layer 706 may be substantially transparent thereby objects or images displayed in the display can be seen through haptic layer 712 and insulated layer 706. It should be noted that display is not a necessary component in order for the interface device to function.

Haptic layer 712, in one embodiment, includes a grid of haptic cells 702, inlet valves 703, and outlet valves 704. Haptic cells 702, in one embodiment, are pockets capable of containing fluid. Haptic layer 712 is similar to haptic layer 612 as shown in FIG. 6(a) except that haptic layer 712 employs porosity membranes. While each inlet valve 703 is controlled by control signal(s) transmitted by wire 713, each outlet valve 704 is controlled by electrical signals transmitted over a wire 714. Every inlet valve 703 or outlet valve 704 employs at least one porosity membrane 710. Porosity membranes 710 are coupled (or face) to a liquid reservoir wherein each membrane 710 is configured to control how much liquid should enter and/or pass through membrane 710. An advantage of using porosity membranes is to maintain the deformation of insulated layer 706 with minimal or no energy consumption.

Figure 8:
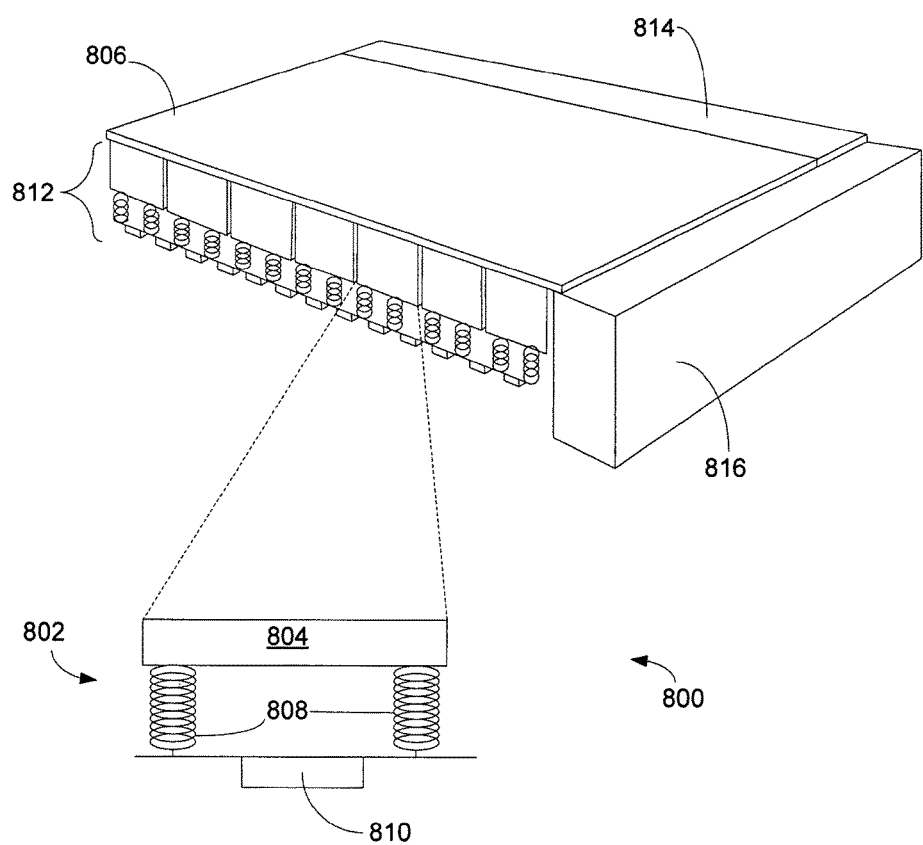
FIG. 8 is a side view of an interface device having an array of haptic cells using various resonant devices in accordance with one embodiment of the present invention.

FIG. 8 is a side view of an interface device 800 having an array of haptic cells 802 using various resonant devices in accordance with one embodiment of the present invention. Device 800 includes an insulated layer 806 and a haptic layer 812. While the top surface of insulated layer 806 is configured to receive an input from a user, the bottom surface of insulated layer 806 is placed adjacent to the top surface of haptic layer 812. The bottom surface of haptic layer 812 is, in one embodiment, placed adjacent to a display (not shown in FIG. 8), wherein haptic layer 812 and insulated layer 806 may be substantially transparent thereby objects or images displayed in the display can be seen through haptic layer 812 and insulated layer 806. It should be noted that display is not a necessary component in order for the interface device to function.

Haptic layer 812, in one embodiment, includes a grid of haptic cells 802, wherein each cell 802 further includes a permanent magnet 804, an electro magnet 810, and two springs 808. Haptic layer 812 is similar to haptic layer 612 shown in FIG. 6(a) except that haptic layer 812 employs resonant devices while haptic layer 612 uses MEMS pumps. Haptic cell 802, in one embodiment, uses a resonant mechanical retractable device to generate haptic effects. The resonant mechanical retractable device vibrates in response to a unique frequency, which could be generated by a side mounted resonant stimulator 816 or a rear mounted resonant stimulator 814. A resonant grid, in one embodiment, is used to form a haptic layer 812. Each cell 802 is constructed using resonant mechanical elements such as Linear Resonant Actuator ("LRA") or MEMS springs. Each cell 802, however, is configured to have a slightly different resonant frequency and a high Q (high amplification at resonance and a narrow resonant frequency band). As such, each cell 802 can be stimulated using mechanical pressure waves originating at the edges of the sheet. The haptic effects can also be generated by a piezoelectric or other high bandwidth actuator that induces acoustic waves.

Cell 802, in another embodiment, includes one spring 808. In yet another embodiment, cell 802 includes more than two springs 808. Each spring 808 is configured to respond to a specific range of frequencies thereby each spring 808 can produce a unique haptic sensation.

Figure 9A:
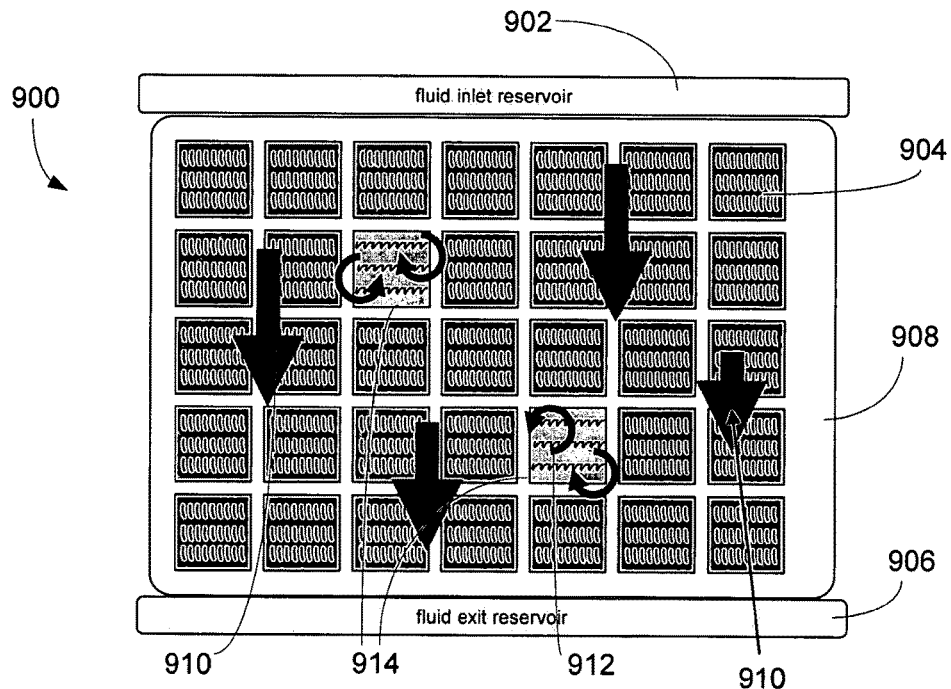
FIG. 9(a-b) illustrates a top view diagram of a multi-touch haptic display 900 having laminar flow of fluid in accordance with one embodiment of the present invention.

FIG. 9(a) illustrates a top view diagram of a multi-touch haptic display 900 having laminar flow of fluid in accordance with one embodiment of the present invention. Display 900 includes a fluid inlet reservoir 902, an array of MEMS cells 904, a fluid exit reservoir 906, and a display 908. Fluid inlet reservoir 902 and fluid exit reservoir 906 facilitate and guide laminar flow 910 from fluid inlet reservoir 902 to fluid exit reservoir 906 as indicated by large arrows. Laminar flow 910 is nonturbulent, streamline, or smooth flow of a viscous fluid between layers. It should be noted that laminar flow 910 and MEMS cells 904 may be substantially transparent thereby objects or images displayed in display 908 can be viewed through laminar flows 910 and MEMS cells 904. It, however, should be noted that display 908 is not a necessary component in order for the device to function.

Display 900 contains an array of individually addressable MEMS cells or haptic elements 904. MEMS cells 904, also known as MEMS turbulence inducing cells, are used to create multiple asynchronous local haptic effects 912 across the display surface. Each asynchronous local haptic effect 912 occurs when a local turbulence is induced by an associated MEMS cell 914. When a MEMS cell 914 is activated, it produces local turbulent flow and induces a vibration or change of surface film texture of the cell 904, which creates a haptic sensation or effect. When a MEMS cell 904 is deactivated, laminar flow can flow through an associated MEMS cell smoothly without any turbulence. Each MEMS cell 904 can be activated independent of other MEMS cells 904 in display 900.

Figure 9B:
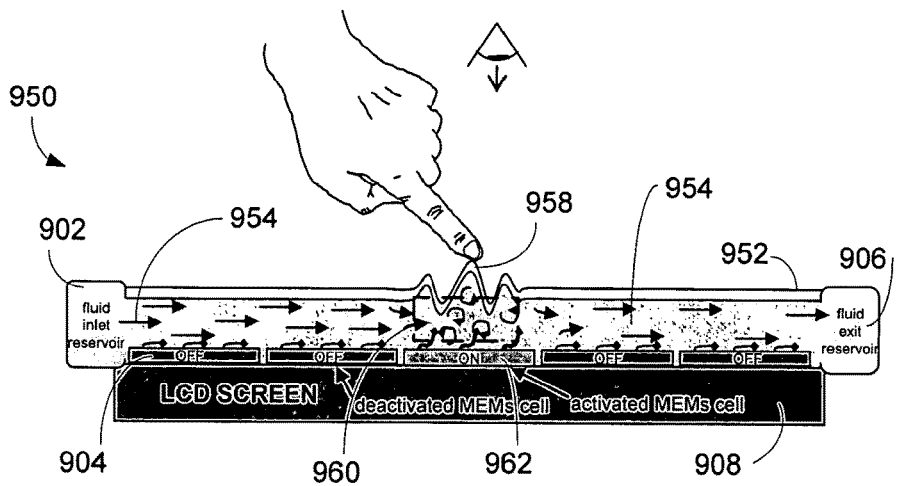

FIG. 9(*b*) illustrates a cross-section view diagram of a multi-touch haptic display 950 having laminar flow of fluid in accordance with one embodiment of the present invention. Display 950 includes a fluid inlet reservoir 902, an array of MEMS cells 904, a fluid exit reservoir 906, a display 908, and a thin flexible transparent membrane 952. As shown in FIG. 9(*b*), smooth laminar fluid flow 954 flows from fluid inlet reservoir 902 to fluid exit reservoir 906 as indicated by many small arrows.

MEMS cells 904 includes multiple redundant deformable structures wherein the deformable structures actuate out of the plane of MEMS cell 904 when it is activated. When a MEMS cell 962 is activated, it activates the deformable structures, also known as hairs, which cause a local patch of flowing fluid to transition from laminar flow to turbulent flow 960. Fluid turbulence flow 960 causes local vibration of membrane and creates a localized haptic sensation 958. Each MEMS cell 904 is addressable and can be activated independent of other MEMS cells 904 in display 950.

The present invention includes various processing steps, which will be described below. The steps of the present invention may be embodied in machine or computer executable instructions. The instructions can be used to cause a general purpose or special purpose system, which is programmed with the instructions; to perform the steps of the present invention. Alternatively, the steps of the present invention may be performed by specific hardware components that contain hard-wired logic for performing the steps, or by any combination of programmed computer components and custom hardware components. While embodiments of the present invention will be described with reference to the Internet, the method and apparatus described herein is equally applicable to other network infrastructures or other data communications environments.

Figure 10:
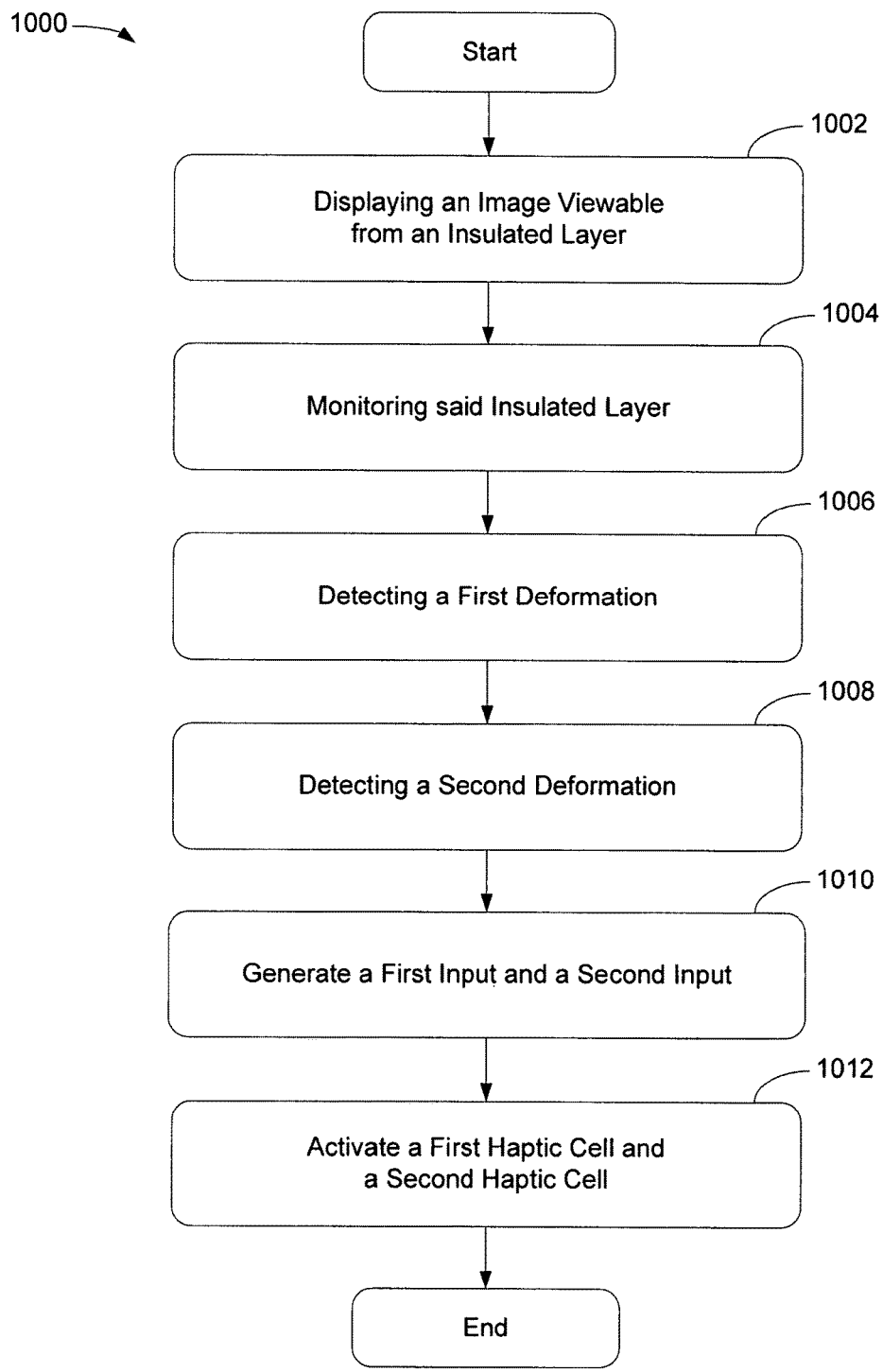
FIG. 10 is a flowchart illustrating a process of providing multiple haptic effects in accordance with one embodiment of the present invention.

FIG. 10 is a flowchart illustrating a process of providing multiple haptic effects in accordance with one embodiment of the present invention. At block 1002, a process displays an image, which is viewable through an insulated layer. In one embodiment, the display can be a flat panel screen or a flexible display. Alternative, the process displays an opaque background without any images. Also, the images may be projected onto the insulated layer from the above or below. It should be noted that if the application does not require displaying images, the display is not necessary and may be removed. In an alternative embodiment, the insulated layer is capable of interfacing with users and receiving inputs. After block 1002, the process moves to the next block.

At block 1004, the process monitors the insulated layer. In one embodiment, the process identifies the image and the possible inputs can be detected in accordance with the image. The process is capable of monitoring multiple contacts substantially same time. The process proceeds to block 1006.

At block 1006, the process detects a first deformation of the insulated layer in response to a first depressing by a first finger. It should be noted that the finger can also be a stylus or any finger-like pointed objects. The process can also detect the first and the second deformations depressed by the same finger. After block 1006, the process moves to the next block.

At block 1008, the process detects a second deformation of the insulated layer substantially same time as the first deformation. The process is also capable of sensing the second deformation in response to a second depressing by a second finger. It should be noted that the second finger can be a stylus or any kind of pointed objects. The process is capable of detecting more deformations of the insulated layer if more depressions or contacts are made. After block 1008, the process moves to the next block.

At block 1010, the process generates a first input in accordance with a location of the first deformation and a second input in accordance with a location of the second deformation. The process is capable of generating more inputs if more contacts or depressions are detected.

At block 1012, the process activates a first haptic cell with a first haptic effect in response to the first input and a second haptic cell with a second haptic effect in response to the second input. In one embodiment, the process initiates the first haptic effect and the second haptic effect substantially the same time. In another embodiment, the process activates a first piezoelectric material of the first haptic cell to generate the first haptic effect and activates a second piezoelectric material of the second haptic cell to generate the second haptic effect. In another embodiment, the process activates a first MEMS element of the first haptic cell to generate the first haptic effect and activates a second MEMS element of the second haptic cell to generate the second haptic effect. In yet another embodiment, the process activates a first fluid filled pocket of the first haptic cell to generate the first haptic effect and activates a second fluid filled pocket of the second haptic cell to generate the second haptic effect.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope all such changes and modifications as are within the true spirit and scope of this invention.

What is claimed is:

1. A tactile touch panel comprising:
   a piezoelectric layer having a first surface and a second surface, wherein the first surface of the piezoelectric layer is configured to receive inputs, and the second surface of the piezoelectric layer is opposite to the first surface; and
   a control circuit,
   wherein the piezoelectric layer comprises an array of cells that are individually addressable via electrical wires that directly address each cell of the array of cells, wherein each cell of the array of cells is able to be activated independent of other cells of the array of cells, wherein at least one cell of the array of cells has piezoelectric material that is unique relative to piezoelectric material of other cells of the array of cells, the at least one cell being configured, when activated, to generate a haptic effect that is unique relative to haptic effects that the other cells are configured to generate when the other cells are activated, and wherein the control circuit is configured to individually activate one or more cells of the array of cells, and wherein the tactile touch panel is part of a vehicle dashboard.

2. The tactile touch panel of claim 1, further comprising a display adjacent to the second surface of the piezoelectric layer, wherein the piezoelectric layer is substantially transparent.

3. The tactile touch panel of claim 2, wherein the one or more cells of the array of cells include multiple cells and the control circuit is configured to create multiple asynchronous haptic effects across a surface of the display by activating multiple cells of the array of cells.

4. The tactile touch panel of claim 3, wherein the control circuit is configured to create the multiple asynchronous haptic effects in response to receiving a plurality of respective simultaneous touch inputs at the tactile touch panel.

5. The tactile touch panel of claim 4, wherein the control circuit is configured to detect via the array of cells respective positions of the simultaneous touch inputs from different fingers.

6. The tactile touch panel of claim 1, wherein each cell of the array of cells has a piezoelectric material that is unique relative to a respective piezoelectric material of the other cells of the array of cells, and wherein each cell of the array of cells is configured to generate a respective haptic effect that is unique relative to each respective haptic effect that each of the other cells is configured to generate.

7. The tactile touch panel of claim 1, wherein each cell of the array of cells has a spring made of a piezoelectric material.

8. The tactile touch panel of claim 7, wherein each spring is a cantilever spring.

9. The tactile touch panel of claim 1, wherein each cell of the array of cells is a rectangular cell having a size that is less than 5 mm×5 mm, the array of cells being separated by borders.

10. The tactile touch panel of claim 1, further comprising:
an electrical insulated layer having a third surface and a fourth surface that is opposite the third surface, wherein the third surface of the electrical insulated layer is configured to receive the inputs, and the fourth surface of the electrical insulated layer is disposed adjacent to the first surface of the piezoelectric layer.

11. The tactile touch panel of claim 1, wherein the piezoelectric layer does not cover an entire surface of the tactile touch panel.

12. The tactile touch panel of claim 1, wherein each cell comprises a linear resonant actuator.

13. The tactile touch panel of claim 1, wherein the piezoelectric layer is substantially opaque.

14. A tactile touch panel comprising:
a display;
a substantially transparent piezoelectric layer having a first surface and a second surface, wherein the first surface of the piezoelectric layer is configured to receive inputs, and the second surface of the piezoelectric layer is disposed adjacent to the display; and
a control circuit,
wherein the piezoelectric layer comprises an array of cells that are individually addressable via electrical wires that directly address each cell of the array of cells, wherein each cell of the array of cells is able to be activated independent of other cells of the array of cells, wherein at least one cell of the array of cells has piezoelectric material that is unique relative to piezoelectric material of other cells of the array of cells, the at least one cell being configured, when activated, to generate a haptic effect that is unique relative to haptic effects that the other cells are configured to generate when the other cells are activated, and
wherein the control circuit is configured to create multiple asynchronous haptic effects across a surface of the display by individually activating multiple cells of the array of cells.

15. The tactile touch panel of claim 14, wherein the control circuit is configured to create the multiple asynchronous haptic effects in response to receiving a plurality of respective simultaneous touch inputs from different fingers at the tactile touch panel.

16. The tactile touch panel of claim 15, wherein the control circuit is configured to detect via the array of cells respective positions of the simultaneous touch inputs.

17. The tactile touch panel of claim 16, wherein each cell of the array of cells has a piezoelectric material that is unique relative to a respective piezoelectric material of other cells of the array of cells, and wherein each cell of the array of cells is configured to generate a respective haptic effect that is unique relative to each respective haptic effect that each of the other cells is configured to generate.

* * * * *